United States Patent
Miyazaki (12) 
(10) Patent No.: US 6,466,252 B1
(45) Date of Patent: Oct. 15, 2002

(54) VIDEO CONFERENCE SYSTEM, AND ITS RESERVATION SERVER, CONTROL UNIT, VIDEO CONFERENCE TERMINAL EQUIPMENT, AND STORAGE MEDIUM STORED THEREIN PROGRAM THEREOF

(75) Inventor: Makoto Miyazaki, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/547,196

(22) Filed: Apr. 12, 2000

(30) Foreign Application Priority Data

Apr. 13, 1999 (JP) .......................................... 11-104843

(51) Int. Cl.[7] ................................................ H04N 7/14
(52) U.S. Cl. ...................... 348/15; 348/348; 348/14.08; 370/260
(58) Field of Search .......................... 348/14.01, 14.08, 348/14.09, 14.1, 14.11, 14.12, 14.14, 14.13; 345/330, 331; 370/260, 261; 709/204, 205; 379/93.21, 202; H04N 7/15

(56) References Cited

U.S. PATENT DOCUMENTS 5,933,417 A * 8/1999 Rotto ......................... 370/260

FOREIGN PATENT DOCUMENTS

| JP | 4-286257 | 10/1992 | |
| JP | 5-145645 | 3/1993 | |
| JP | 6-141315 | 5/1994 | |
| JP | 7-37009 | 2/1995 | |
| JP | 409044932 A | * 2/1997 | ........... G11B/15/02 |

* cited by examiner

Primary Examiner—Melur Ramakrishnaiah
(74) Attorney, Agent, or Firm—Dickstein, Shapiro, Morin & Oshinsky, LLP.

(57) ABSTRACT

A video conference system enables a video conference to be opened with the exception that a reservation server which accepts the reservation of the conference executes control of conference opening. A user inputs reservation information of the video conference relative to a reservation server while using a personal computer. When the reservation server accepts reservation, the reservation server generates a reservation number. The reservation server transmits the reservation number to any of multi-point control units. The multi-point control unit manages a reserved reservation number. A conference participant inputs the above reservation number on the occasion of circuit connection as a sub-address from any of the video conference terminal devices. The multi-point control unit receives the above reservation number on the occasion of signal reception. The multi-point control unit decides whether or not the reservation number received is the same number that the multi-point control unit manages. If the both numbers agree, it causes the conference to be opened. When another conference participant performs circuit connection with the same reservation number, it causes the conference participant to participate in the video conference which was just opened.

6 Claims, 7 Drawing Sheets

(RESERVATION INFORMATION)
THE DAY AND TIME OF RESERVATION: JANUARY 26,1999,15:00~17:00
NUMBER OF PARTICIPANT POINT: 04
MULTI-POINT CONTROL UNIT NUMBER: 02    ~21

⇒ NUMERALS TO BE ARRANGED IN ORDER OF THE DAY AND TIME OF THE RESERVATION/
THE NUMBER OF PARTICIPATED POINT/
AND A MULTI-POINT CONTROL UNIT NUMBER.

(CHARACTER STRING) 19 99 01 26 15 00 17 00 04 02    ~22

⇒ NUMERALS TO BE FORMED INTO A SET OF TWO NUMERALS IN ORDER FROM THE HEAD.
THE TWO NUMERALS FORMED INTO THE SET ARE ADDED BEFORE USING THE NUMERAL
OF SITUATION OF ONE (1) AS THE RESERVATION NUMBER.
19 -- 1+9=10 → 0,   99 -- 9+9=18 → 8,   01 -- 0+1=1 → 1

IN ORDER TO DISCRIMINATE THE CONFERENCE WHOSE RESERVATION NUMBER
BECOMES THE SAME RESERVATION NUMBER AS ANOTHER ONE, TWO DIGITS TO BE
ADDED TO THE LAST OF THE RESERVATION NUMBER. NO EXISTENCE OF THE SAME RESERVATION
NUMBER "01" IS ADDED. TWO EXISTENCE OF THE SAME RESERVATION
NUMBER, "02" IS ADDED. HERE, ONE EXISTENCE RESERVATION NUMBER, ADDING "01"

(RESERVATION NUMBER)    ~23

FIG. 7

VIDEO CONFERENCE SYSTEM, AND ITS RESERVATION SERVER, CONTROL UNIT, VIDEO CONFERENCE TERMINAL EQUIPMENT, AND STORAGE MEDIUM STORED THEREIN PROGRAM THEREOF

BACKGROUND OF THE INVENTION

The present invention relates to a video conference system, and its reservation server, a control unit, a video conference terminal device, and a storage medium including a program stored thereon, which are used for the video conference system.

DESCRIPTION OF THE PRIOR ART

In the conventional video conference system, a reservation server manages reservation information of the video conference from the user. The reservation server controls a multi-point control unit on the basis of the reservation information. The multi-point control unit on the basis of the reservation information. The multi-point control unit performs connection of the video conference terminal devices in response to the control according to the reservation information. Thus the video conference is opened. The reservation information of the video conference includes opening time of the video conference, end time of the video conference, video conference terminal devices which participate in the conference, and so forth. The information of the video conference terminal device is place information of circuit number and so forth. The reservation server registered therein place information of respective video conference terminal devices beforehand. The user selects the video conference terminal device to sit on the conference from a list on the occasion of reservation. The reservation server causes control for the sake of connection of selected video conference terminal devices at the time of reservation to be executed to the multi-point control unit on the occasion of opening of the conference.

However, in the conventional video conference system, the reservation server implements not only acceptance of the reservation, but also control of opening of the conference. Consequently, if the reservation server does not control the multi-point control unit for the sake of opening of the conference, the video conference terminal device is incapable of opening the conference. For instance, when fault and so forth occur in the reservation server, there is the problem that the reservation is incapable of being executed. Further, the reserved video conference becomes incapable of opening.

SUMMARY OF THE INVENTION

In view of the foregoing, it is an object of the present invention, in order to overcome the above mentioned problem, to provide a video conference system, and its reservation server, a control unit, a video conference terminal device, and a storage medium including a program stored thereon wherein the reservation server does not control opening of the video conference in order to enable the reserved conference to be opened surely.

According to a first aspect of the present invention, in order to achieve the above mentioned object, there is provided a video conference system which comprises a plurality of video conference terminal devices, a control unit causing a video conference to be executed while connecting the plurality of video conference terminal devices selectively, a reservation unit for inputting therein reservation information in order to reserve the video conference by a user, and a reservation server which accepts the reservation information before generating individual reservation number for the sake of reserved video conference to inform to the reservation unit and the control unit, wherein the control unit causes a video conference to be opened when the reservation number sent from the video conference terminal device agrees with the informed reservation number while connecting the video conference terminal device as members participating to the reserved video conference.

According to a second aspect of the present invention, in the first aspect, there is provided a video conference system, wherein the reservation number is generated in such a way that the reservation number is encoded on the basis of the reservation information.

According to a third aspect of the present invention, there is provided a reservation server in the video conference system which comprises a reception means for receiving reservation information in order to reserve the video conference inputted from the user, and a generating means for generating to be outputted individual reservation number for the sake of the video conference according to the received reservation information.

According to a fourth aspect of the present invention, in the third aspect, there is provided a reservation server in the video conference system, wherein the generating means for generating the reservation number in such a way that the reservation number is encoded on the basis of the reservation information.

According to a fifth aspect of the present invention, there is provided a control unit in the video conference system which comprises a maintaining means for receiving to be maintained individual reservation number for the sake of reserved video conference, and a control means for comparing the reservation number sent from a plurality of video conference terminal equipments respectively with the maintained reservation number, thus causing the video conference to be opened while connecting the plurality of video conference terminal devices when the former reservation number agrees with the later reservation number.

According to a sixth aspect of the present invention, there is provided a video conference terminal device in the video conference system which comprises a transmitting means for transmitting an individual reservation number for the sake of the reserved video conference to a control unit for connecting a plurality of video conference terminal devices participating in the video conference.

According to a seventh aspect of the present invention, there is provided a storage medium storing therein a program for executing the processing for receiving reservation information in order to reserve a video conference inputted from a user, and a processing for generating to be outputted an individual reservation number for the sake of the video conference according to the received reservation information.

According to an eighth aspect of the present invention, there is provided a storage medium storing therein a program for executing the processing for receiving to be maintained an individual reservation number for the sake of reserved video conference, and a processing for comparing a reservation number sent from a plurality of video conference terminal devices with the maintained reservation number, before opening the video conference while connecting the plurality of video conference terminal devices when the former reservation number agrees with the later reservation number.

According to a ninth aspect of the present invention, there is provided a storage medium storing therein a program for executing the processing for sending an individual reservation number for the sake of reserved video conference to a control unit for connecting a plurality of video conference terminal devices participating in the video conference.

According to a tenth aspect of the present invention, there is provided a video conference opening method comprising the steps of a step for providing a plurality of video conference terminal devices, a step for causing a video conference to be executed while connecting the plurality of video conference terminal devices selectively by means of a control unit, a step for inputting therein reservation information in order to reserve the video conference by a user by means of a reservation unit, and a step for accepting the reservation information before generating individual reservation number for the sake of reserved video conference to inform to the reservation unit and the control unit by means of a reservation server;

wherein the control unit causes a video conference to be opened when the reservation number sent from the video conference terminal equipment agrees with the informed reservation number while connecting the video conference terminal devices as members participating in the reserved video conference.

The above and further objects and novel features of the invention will be more fully understood from the following detailed description when the same is read in connection with the accompanying drawings. It should be expressly understood, however, that the drawings are for purposes of illustration only and are not intended as a definition of the limits of the invention.

DETAILED DESCRIPTION OF THE PREFERRED EMBODIMENTS

A preferred embodiment of the present invention will be explained in detail in accordance with the accompanying drawings.

Figure 1:
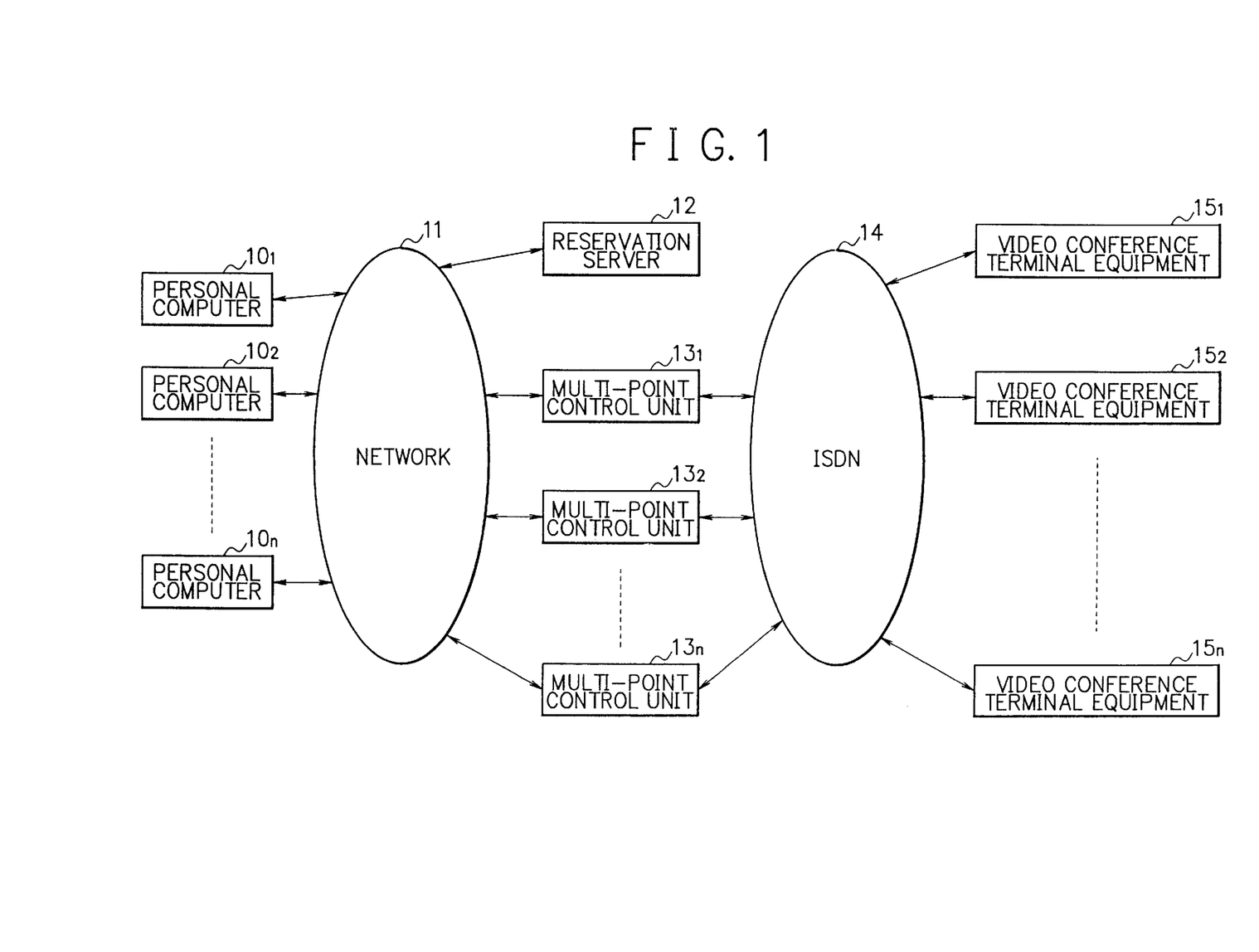
FIG. 1 is a block diagram showing a configuration of a video conference system according to an embodiment of the present invention.

FIG. 1 is a block diagram showing a video conference system according to an embodiment of the present invention.

The video conference system of the present embodiment is a system executing a video conference while using ISDN (Integrated Services Digital Network). In such a video conference system, it causes circuit connection of a reservation number which is issued on the occasion of reservation of a video conference to be executed as a sub-address on the occasion of the circuit connection. The sub-address executes both of opening of the conference and certification of the conference.

In FIG. 1, a reservation server 12 is connected to personal computers $10_1$ to $10_n$ through LAN (Local Area Network) or WAN (Wide Area Network). The subscriber of the video conference causes the personal computers $10_1$ to $10_n$ to be connected to the reservation server 12 through network 11 such as LAN (Local Area Network), WAN (Wide Area Network) and so forth, before executing reservation of the video conference. Reservation information is the day and time of opening of the conference, the day and time of end of the conference, the number of connection place, and so forth. The subscriber executes reservation in connection with such reservation information. When the reservation is completed, the reservation server 12 generates an individual reservation number specific to the video conference. The reservation server 12 issues the reservation number to the user. Simultaneously, the reservation server 12 transmits the above described reservation number and necessary information for the sake of opening of the conference to any of the multi-point control units $13_1$ to $13_n$ in which the conference is opened. The multi-point control units $13_1$ to $13_n$ manage both of the reservation number and the reservation information according to a database.

A participant of the video conference inputs the above described reservation number as the sub-address on the occasion of the circuit connection, before executing circuit connection to the multi-point control unit. The multi-point control unit receives the reservation number from received sub-address information informed from ISDN 14 on the occasion of reception. The multi-point control unit retrieves the reservation number which is managed. The multi-point control unit decides whether or not the conference is reserved. When the conference is the reserved conference, it causes the conference to be opened in accordance with the reserved content. In the case where another participant of the conference executes circuit connection with the same reservation number, the multi-point control unit causes the another participant of the conference to participate in the video conference which is opened.

Thus, in the present embodiment, the reservation number is issued on the occasion of the video conference reservation. The video conference is opened on the basis of such reservation number. Consequently, it is unnecessary to execute processing of the opening of the conference to the multi-point control unit before starting of the conference. It is capable of implementing certification of the conference according to the fact that the reservation number is used.

Next, there will be explained the constitution of FIG. 1 and operation in detail.

In FIG. 1, the present video conference system consists of personal computers $10_1$ to $10_n$ as reservation equipment which the user uses for the sake of reservation, a network 11, a reservation server 12, multi-point control units $13_1$ to $13_n$, an ISDN 14, and video conference terminal devices $15_1$ to $15_n$.

The personal computers $10_1$ to $10_n$, the reservation server 12, and the multi-point control units $13_1$ to $13_n$ are connected to the network 11 by the communication line such as communication cable and so forth. The network 11 is a network such as LAN and so forth.

The personal computers $10_1$ to $10_n$ are capable of executing reservation of the video conference while being connected to the reservation server 12 through the network 11. The reservation server 12 implements resource management of the multi-point control units $13_1$ to $13_n$ in order to provide vacancy information and so forth to the subscriber, the reservation server 12 is capable of accepting the reservation.

The multi-point control units $13_1$ to $13_n$ and the video conference terminal devices $15_1$ to $15_n$ are connected to the ISDN 14 by the communication line such as the communication cable and so forth. The multi-point control units $13_1$ to $13_n$ are controllers which are capable of realizing video conference function among multi places while selectively connecting a plurality of the video conference terminal devices $15_1$ to $15_n$ respectively.

The video conference terminal devices $15_1$ to $15_n$ communicate the picture and the sound to the remote place while connecting a camera, a monitor, a mike, a speaker and so forth.

In the present embodiment, the personal computers $10_1$ to $10_n$ are the communication terminal devices as the reservation equipment for executing reservation of the video conference. The personal computer generally used in the office or a dedicated terminal for the sake of reservation is suitable for the above-described personal computer. Further, it is also suitable that the personal computers $10_1$ to $10_n$ and the reservation server 12, and the multi-point control units $13_1$ to $13_n$ are connected respectively by the communication cable and so forth and not through the network 11. Furthermore, the multi-point control units $13_1$ to $13_n$ are constituted by a plurality of controllers, however, it is suitable to be constituted by only one controller.

Next, there will be explained operation of the video conference system of FIG. 1 referring to flowchart shown in FIGS. 2 and 5, and FIGS. 6 and 7.

Figure 2:
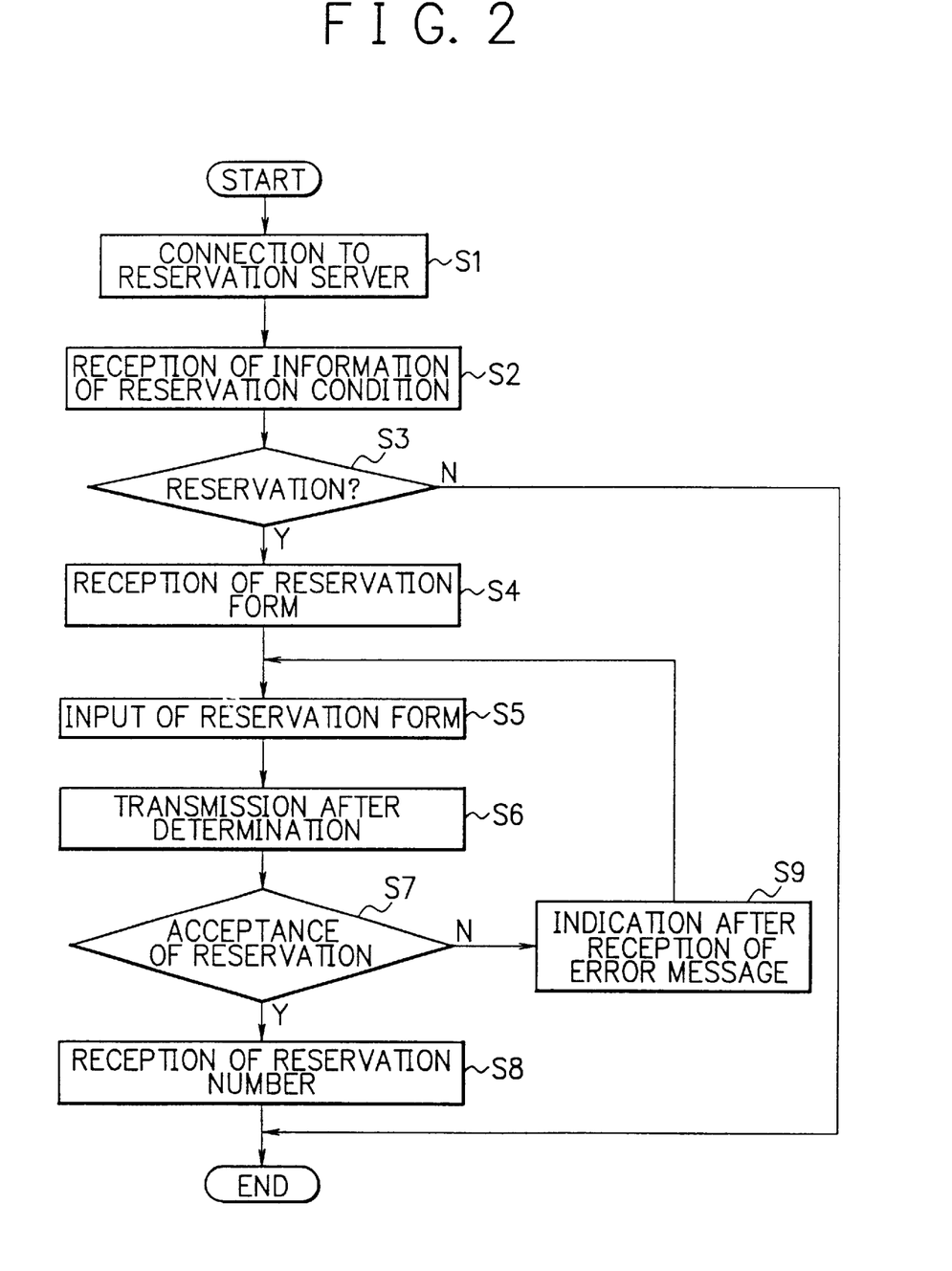
FIG. 2 is a flowchart showing operation of a personal computer.

Firstly, in FIG. 2, the personal computers $10_1$ to $10_n$ are connected to the reservation server 12 through the network 11. Under such the condition, operation of the personal computers $10_1$ to $10_n$ will be explained on the occasion of the reservation of the video conference. Here, the explanation is simplified, because of the supposition that the personal computer $10_1$ executes reservation.

In FIG. 2, when the personal computer $10_1$ is connected to the reservation server 12 (STEP S1), the personal computer $10_1$ receives information of reservation conditions from the reservation server 12 (STEP S2). With respect to the reservation conditions, conditions and so forth of the multi-point control units $13_1$ to $13_n$ are indicated corresponding to a period of predetermined fixed term. When the day and time wished to reserve is not vacant, or only reference of reservation conditions is executed, connection to the reservation server is disconnected. While when the multi-point control unit is vacant at the day and time wished to reserve, the reservation is executed (STEP S3).

When the user selects the multi-point control unit wished to use and the day and time wished to use on the picture of the personal computer $10_1$ the personal computer $10_1$ receives the reservation form from the reservation server 12 (STEP S4). The personal computer $10_1$ inputs therein necessary information such as the day and time of opening the conference, the day and time of end of the conference in accordance with the reservation form (STEP S5). When input of the reservation form is terminated, thus the input is confirmed, the personal computer $10_1$ transmits the reservation information to the reservation server 12 (STEP S6). When the reservation server accepts the reservation, the reservation number together with the notification of reservation completion are issued from the reservation server 12 (STEP S7, STEP S8). Further, when there is imperfection on the reservation content, the personal computer $10_1$ receives error message from the reservation server 12 to input the reservation form again (STEP S9).

Next, operation in which the personal computers $10_1$ to $10_n$ are connected to the reservation server 12 through the network 11, before the reservation server accepts the reservation of the video conference will be explained referring to FIG. 3. Here, in order to simplify explanation, there will be explained that on the supposition that the personal computer $10_1$ had reserved the conference using the multi-point control unit $13_1$.

Figure 3:
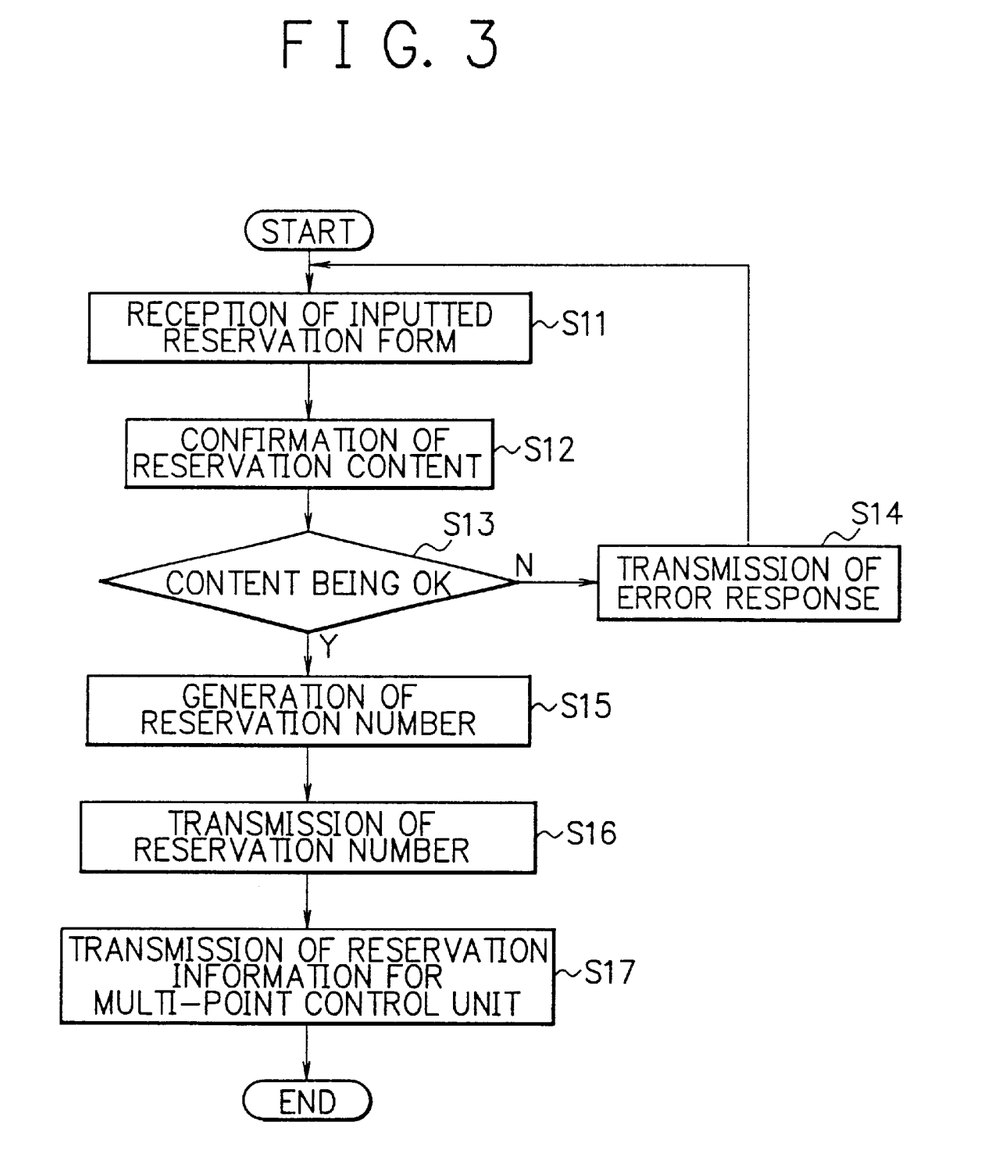
FIG. 3 is a flowchart showing operation of a reservation server.

In FIG. 3, when the reservation server 12 receives the reservation information from the personal computer $10_1$ (STEP S11), the reservation server 12 confirms the inputted content (STEP S12). The confirmation of the reservation content is that the reservation server 12 confirms that the reservation time overlaps with the time already reserved, and so forth. It causes the necessary procedures to be followed on the basis of the result of confirmation of the content. When there is imperfection on the content, the reservation server 12 transmits an error message (STEP S13, STEP S14). While when there is no imperfection, the reservation server 12 generates an individual reservation number on the basis of reserved content, before transmitting to the personal computer $10_1$ (STEP S15, STEP S16). Together with this matter, the reservation server 12 transmits the above described reservation number and the necessary information for opening of the conference to the reserved multi-point control unit $13_1$ through the network 11 (STEP S17).

Figure 7:
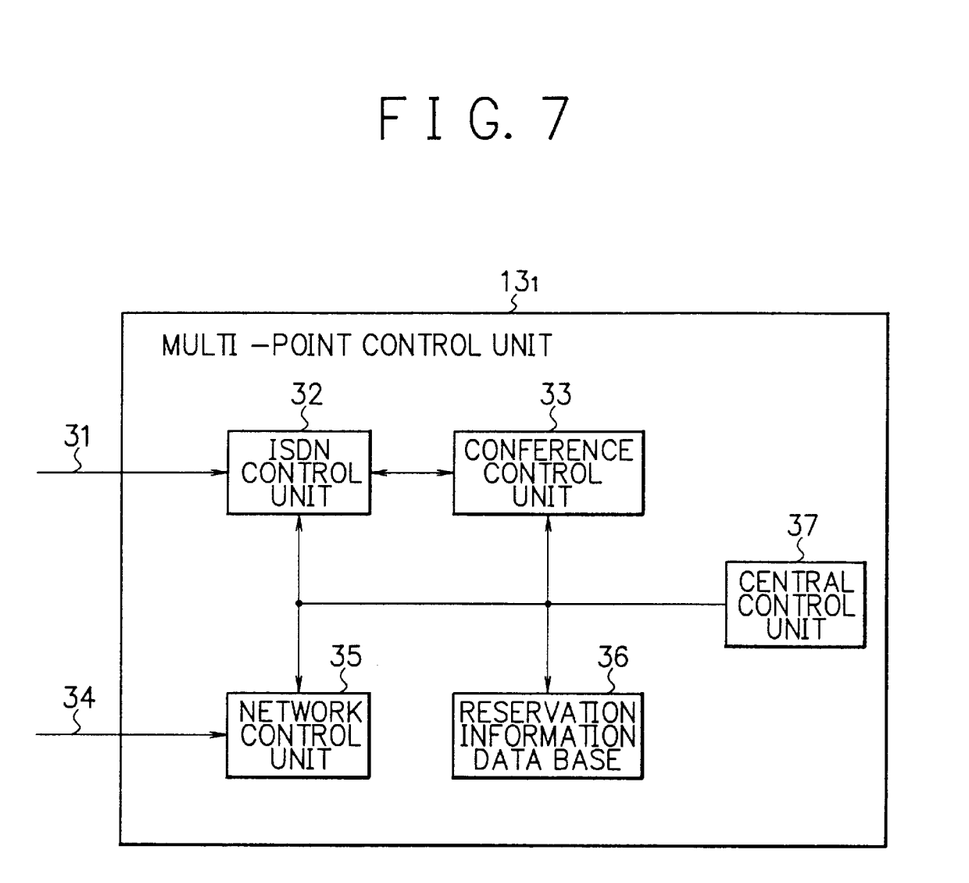
FIG. 7 is a block diagram showing a configuration of a multi-point control unit.

Next, there will be described operation of the multi-point control unit $13_1$ which has received the reservation number and the necessary information for the sake of opening of the conference with reference to FIG. 7.

The data from the reservation server 12 is received by the network control unit 35 of the multi-point control unit $13_1$ through the network 11 and the communication cable 34. The network control unit 35 informs to a central control unit 37 that the network control unit 35 receives therein the data. The central control unit 37 executes control that it causes the data including the reservation number which the network control unit 35 receives to be maintained to reservation information database 36.

Next, there will be described one example of a method for generating the reservation number while encoding. Here, in order to simplify the explanation, the embodiment will be described on the supposition that reservation is implemented according to content of reservation information 21 shown in FIG. 6.

Figure 6:
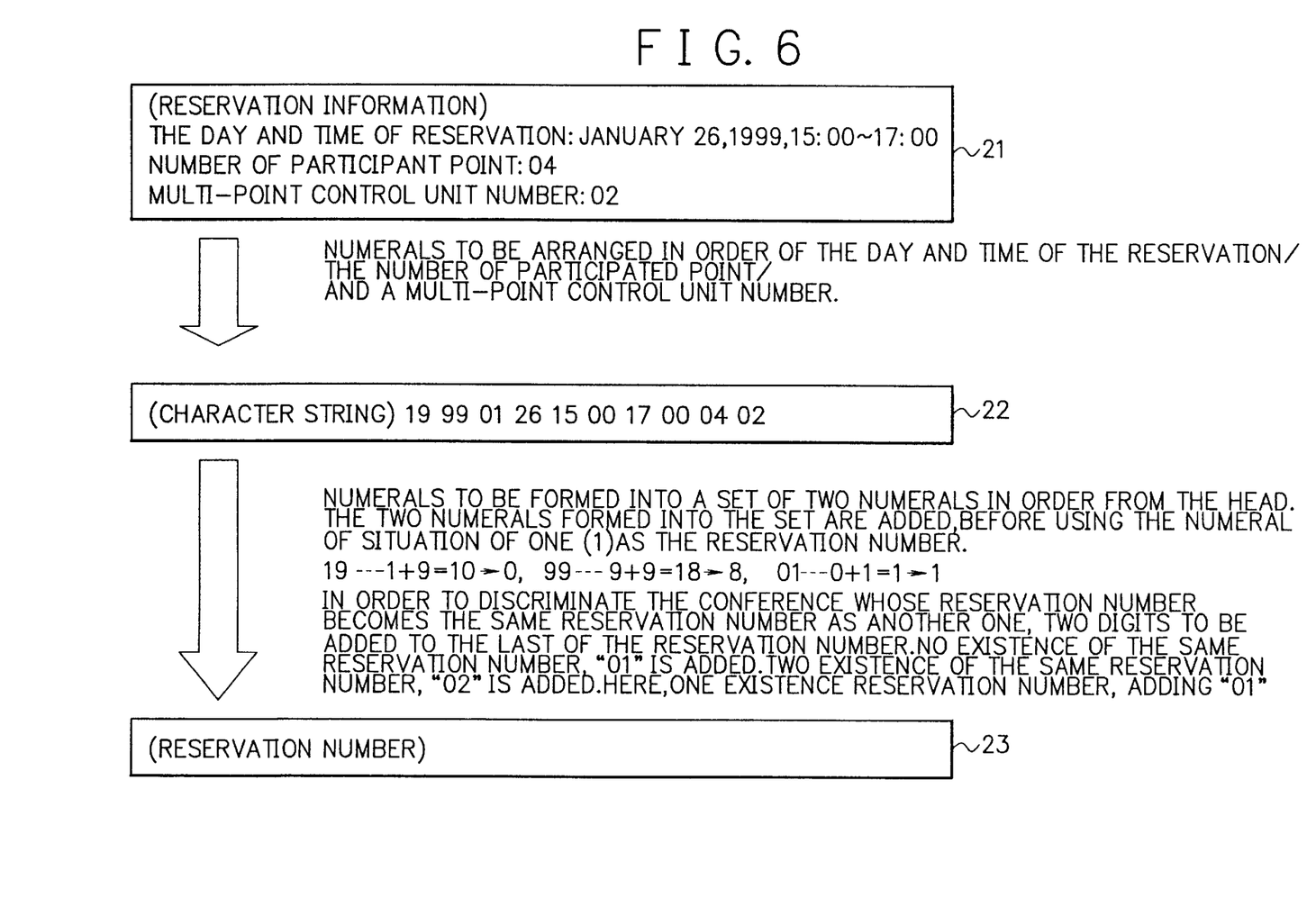
FIG. 6 is a constitution view showing generating method of reservation number.

Character string 22 is generated while arranging respective numerals of the reservation information 21. The character string 22 is generated in such a way that it causes the numerals to be arranged in order of the day and time of the reservation, the number of participated point, and a multi-point control unit number. Next, it causes arranged numerals to be formed into a set of two numerals in order from the head. The two numerals formed into the set are added, from the result thereof, causing the numeral of position of one (1) to be used as the reservation number.

Further, the multi-point control unit $13_1$ is capable of setting a plurality of conferences in the same time. It is necessary to discriminate the conference whose reservation number becomes the same reservation number as that of the other conference. In order to discriminate the conference whose reservation number becomes the same reservation number as another one, it causes a number with two digits to be added to the last of the reservation number. In the case where there does not exist the same reservation number in the already reserved conference, "00" is added. In the case where there exists one reservation number as the same reservation number in the already reserved conference, "01" is added. In the case where there exists two reservation numbers as the same reservation number in the already reserved conference, "02" is added. FIG. 6 shows the situation where on reservation number exists as the same reservation number. Consequently, a twelve-digit reservation number 23 is generated while adding "01". This generating method of the reservation number is one example. It is suitable that the reservation number is generated by another method according to the condition that it causes the digit number of the reservation number to be decreased.

Figure 4:
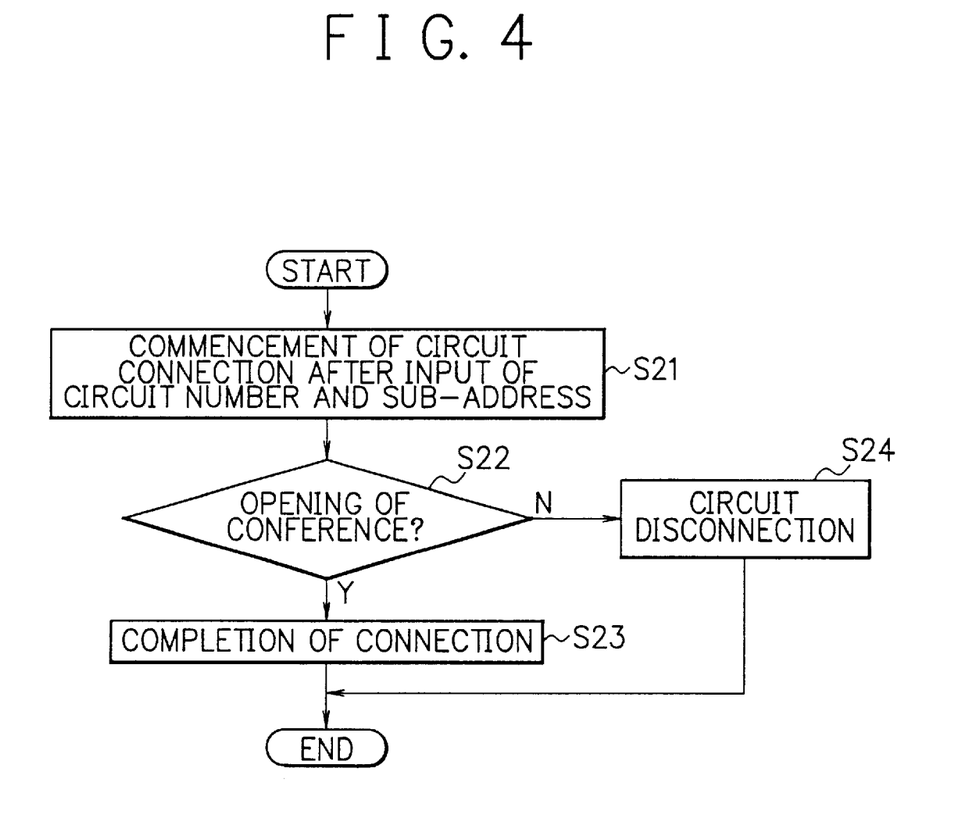
FIG. 4 is a flowchart showing operation of a video conference terminal device.

Next, there will be described the operation of the device with reference to FIG. 4. The operation of the video conference terminal devices $15_1$ to $15_n$ which are connected to the multi-point control units $13_1$ to $13_n$ is described on the occasion that the video conference is opened while using the reservation number. Here, in order to simplify the explanation, description is made on the supposition that the user opens the conference while connecting the video conference terminal device $15_1$ to the multi-point control unit $13_1$.

Opening of the conference is implemented according to the fact that it causes the circuit connection to be performed at the reserved time from the video conference terminal device $15_1$ to the multi-point control unit $13_1$ through the ISDN 14. There is a circuit connection menu in the video conference terminal device $15_1$. Consequently, the video conference terminal device $15_1$ is capable of specifying a circuit number of the other party for connection and a sub-address. The video conference terminal device $15_1$ inputs the circuit number of the multi-point control unit $13_1$ for specification of the circuit number of the other party. The video conference terminal device $15_1$ inputs the reservation number acquired on the occasion of the reservation for specification of the other party sub-address, according to the circuit connection menu of the video conference terminal device $15_1$, before confirming it (STEP S21 of FIG. 4).

When the reservation number is confirmed in the multi-point control unit $13_1$, the video conference with reserved content is opened (STEP S22, STEP S23). Further, when the reservation is not executed from the result of confirmation of the reservation number in the multi-point control unit $13_1$ circuit is disconnected. When there is an error in the reservation number from the result of confirmation of the reservation number in the multi-point control unit $13_1$, circuit is disconnected. (STEP S22, STEP S24).

Next, there will be explained operation of opening of the conference while using FIG. 5. When the video conference is opened using the reservation number, the video conference terminal devices $15_1$ to $15_n$ are connected to the multi-point control units $13_1$ to $13_n$. Here, in order to simplify the explanation, the embodiment will be described based on the supposition that the conference is opened while performing the circuit connection that the video conference terminal device $15_1$ is connected to the multi-point control unit $13_1$. Subsequently, the video conference terminal device $15_2$ is connected to the multi-point control unit $13_1$.

Figure 5:
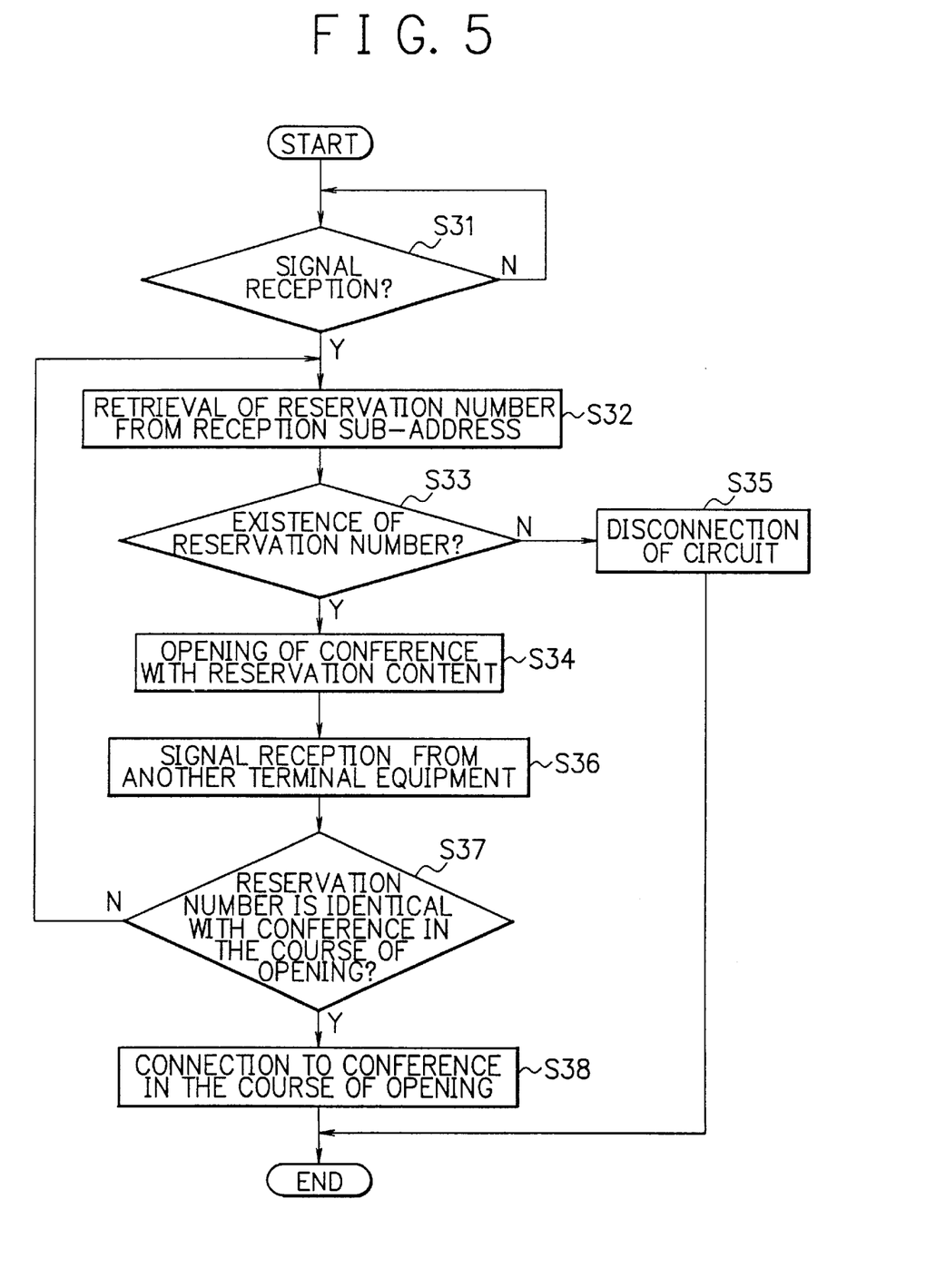
FIG. 5 is a flowchart showing operation of opening of the conference.

The multi-point control unit $13_1$ waits for signal reception from the video conference terminal devices $15_1$ to $15_n$ (STEP S31 of FIG. 5). The multi-point control unit $13_1$ refers to a reception sub-address informed from the ISDN 14 while connecting with the video conference terminal device $15_1$. The reception sub-address is the reservation number of the video conference, which the video conference terminal device $15_1$ inputs such the reservation number on the occasion of circuit connection.

The reservation number is received to be managed in the database beforehand. The multi-point control unit $13_1$ retrieves the reservation number managed in the database from the reservation server 12 (STEP S32). When there is no reservation number while retrieving, the multi-point control unit $13_1$ disconnects the circuit (STEP S33, STEP S35). While when there is the reservation number while retrieving, the multi-point control unit $13_1$ opens the video conference in accordance with the reserved content (STEP S33, STEP S34). The video conference opens. FIG. 6 shows the content of the reservation information 21. The video conference opening will be explained with such the reservation information as an example. The video conference terminal device $15_1$ inputs the reservation number 23[081860804201] to the sub-address at 15:00, Jan. 26, 1999 before performing the circuit connection.

The multi-point control unit $13_1$ receives the above reservation number 23[081860804201] before retrieving the reservation number which is managed at the database. The multi-point control unit $13_1$ finds the reservation number. The multi-point control unit $13_1$ opens the video conference of four-point conference until 17:00 while referring to the reservation content. The video conference terminal device $15_1$ waits for other participants of the conference while maintaining such conditions.

Next, there is a signal reception from the video conference terminal device $15_2$. The multi-point control unit $13_1$ refers to the reception sub-address informed from the ISDN 14. The multi-point control unit $13_1$ confirms whether or not the reservation number there from is the same reservation number as the conference that was just opened (STEP S36, STEP S37). If the reservation number from the video conference terminal device $15_2$ is [081860804201], the video conference terminal device $15_1$ causes the video conference terminal device $15_2$ to participate in the video conference as a member of the conference (STEP S38). Further, when the reservation number received from the video conference terminal device differs from the reservation number of the conference which was just opened, the multi-point control unit $13_1$ retrieves the reservation number which is managed in the database (STEP S37, STEP S32).

When there is no reservation number while retrieving, the multi-point control unit disconnects the circuit (STEP S33, STEP S35). When there exists a reservation number, the multi-point control unit opens another video conference newly in accordance with the reservation content (STEP S33, STEP S34). Furthermore, simultaneously, when there is signal reception from the third, and the fourth video conference terminal devices with the reservation number of [081860804201], the multi-point control unit causes such the third and the fourth video conference terminal devices to participate in the video conference to which the video conference terminal device $15_1$ and the video conference terminal device $15_2$ have been already participated as the member of the conference.

Next, there will be described processing for retrieval of reservation number with reference to FIG. 7. On the occasion of the signal reception to the multi-point control unit $13_1$, it causes the reservation number to be retrieved from the reception sub-address informed from ISDN 14 according to the database.

In the multi-point control unit $13_1$, the ISDN control unit 32 is connected to the ISDN 14 through the communication cable 31. When there is the signal reception from the video conference terminal devices $15_1$ to $15_n$, the ISDN control unit 32 informs that there is the signal reception to the central control unit 37. The central control unit 37 executes retrieval of the reservation number from the reception sub-address informed from the ISDN 14 according to the reservation information database 36. From the result of the retrieval, when the reservation number is found, the central control unit 37 executes control of the conference opening to the conference control unit 33 in accordance with the reservation content. While when the reservation number is not found, the central control unit 37 executes instruction of circuit disconnection to the ISDN control unit 32, before disconnecting the circuit.

According to the present embodiment, when it causes the reserved video conference to be opened, the video conference terminal device executes circuit connection while inputting the reservation number into the sub-address. The multi-point control unit receives the reception signal from the video conference terminal device. The multi-point control unit receives the reservation number according to the reception sub-address informed from the ISDN on the occasion of the signal reception from the video conference terminal device. The multi-point control unit refers to the database. The multi-point control unit opens the conference when the same reservation number as the number which is received is found while referring to the database. For that reason, it is unnecessary to control the conference opening from the reservation server on the occasion of opening time of the reserved conference. It is capable of opening the video conference automatically in the course of circuit connection processing.

Furthermore, when the personal computers $10_1$ to $10_n$, the reservation server 12, the multi-point control units $13_1$ to $13_n$, and the video conference terminal device $15_1$ to $15_n$ in FIG. 1 are constituted by respective CPU (Central Processing Unit), MPU (Microprocessor Unit), and computer system using memory, the above-mentioned memory constitutes a storage medium according to the present invention.

The storage medium stores therein a program which executes processing including the flowcharts shown in FIGS. 2 to 5 for executing operation explained in the above-described embodiment.

It is capable of being used an optical disk, a magnet-optical disk, a magnetic recording medium, a semiconductor, a memory, and so forth as the storage medium.

As described above, according to the present invention, when the user reserves a video conference to the reservation server, the reservation server generates an individual reservation number to this video conference. The reservation server informs the user and the control units such as the multi-point control unit and so forth. When the video conference is opened in accordance with the reservation, the video conference terminal device sends the reservation number to the control unit. The control unit opens the conference in the case where the reservation number from the video conference terminal device agrees with the informed reservation number. It is unnecessary to control opening of the conference using the reservation server on the occasion of opening time of the reserved video conference. It is surely capable of opening the video conference automatically in the course of circuit connection processing.

Further, the reservation number is set beforehand, before the reservation number is referred to. The video conference system is constituted such that when the reservation number is the reserved reservation number, it is capable of opening and participating to the conference. When the reservation number is unknown, it is incapable of participating to the conference. Thus, it is capable of protecting security of the conference.

Furthermore, since the reservation number is constituted in such a way that the reservation number is generated while encoding conference information, it is incapable of guessing the reservation number easily. Consequently, it is capable of protecting security of the conference.

While preferred embodiments of the invention have been described using specific terms, the description has been for illustrative purposes only, and it is to be understood that changes and variations may be made without departing from the spirit or scope of the following claims.

What is claimed is:

1. A video conference system comprising:
   a plurality of video conference terminal devices;
   a control unit effective to cause a video conference to be executed by connecting said plurality of video conference terminal devices selectively;
   a reservation unit for inputting therein reservation information in order to reserve said video conference by a user; and
   a reservation server which accepts said reservation information before generating an individual reservation number for the sake of a reserved video conference to inform said reservation unit and said control unit;
   wherein said control unit causes a video conference to be opened, without use of said reservation unit, when the reservation number sent from said video conference terminal device matches with the individual reservation number while connecting said video conference terminal devices as members participating in said reserved video conference.

2. A video conference system as claimed in claim 1, wherein said reservation number is generated in such a way that said reservation number is encoded on the basis of said reservation information.

3. A control unit in a video conference system comprising:
   a maintaining means for receiving to be maintained an individual reservation number for the sake of a reserved video conference; and
   a control means for comparing the reservation number sent from a plurality of video conference terminal devices respectively with said maintained reservation number, thus causing the video conference to be opened, without use of said maintaining means, while connecting said plurality of video conference terminal devices when the reservation number from said video conference terminal devices matches with the maintained reservation number.

4. A video conference opening method comprising the steps of:
   providing a plurality of video conference terminal devices;
   causing a video conference to be executed while connecting said plurality of video conference terminal devices selectively by means of a control unit;
   inputting reservation information in order to reserve said video conference by a user by means of a reservation unit; and
   generating an individual reservation number for the sake of a reserved video conference to inform said reservation unit and said control unit by means of a reservation server;

wherein said control unit causes a video conference to be opened, without use of said reservation unit, when a reservation number sent from said video conference terminal device matches with said informed reservation number while connecting said video conference terminal devices as members participating in said reserved video conference.

5. A method for initiating a video conference among a plurality of video conference terminals, said method comprising the steps of:

receiving reservation information by a reservation unit, said reservation information used to identify a reserved video conference;

generating an individual reservation number corresponding to said reserved video conference;

receiving a requesting reservation number by a control unit from a video conference terminal device; and initiating said reserved video conference by said control unit, and without use of said reservation unit, when the requesting reservation number received from said video conference terminal device substantially matches with said individual reservation number.

6. A video conference system comprising:

a plurality of video conference terminal devices;

a control unit effective to initiate a video conference by selectively connecting said plurality of video conference terminal devices;

a reservation unit which receives reservation information used to identify a reserved video conference by a user; and a reservation server which receives said reservation information from said reserving unit and generates an individual reservation number corresponding to said reserved video conference;

wherein said control unit initiates said video conference, without use of said reservation unit, when a reservation number received from a video conference terminal device matches with said individual reservation number.

* * * * *